United States Patent [19]

Fleming et al.

[11] Patent Number: 5,472,937
[45] Date of Patent: Dec. 5, 1995

[54] INVERT EMULSION DRILLING MUD

[75] Inventors: James K. Fleming; Harold C. Fleming, both of Calgary, Canada

[73] Assignees: J.K.F. Investments Ltd.; Hour Holdings Ltd., both of Calgary, Canada

[21] Appl. No.: 138,096

[22] Filed: Oct. 20, 1993

[30] Foreign Application Priority Data

Aug. 4, 1995 [CA] Canada .................................. 2101884

[51] Int. Cl.⁶ .................................................. C09K 7/00
[52] U.S. Cl. .................................................. 507/140
[58] Field of Search .................................. 507/140, 141, 507/145

[56] References Cited

U.S. PATENT DOCUMENTS

| | | | |
|---|---|---|---|
| 2,239,647 | 4/1941 | Garrison | 507/140 |
| 2,856,356 | 10/1958 | Weiss et al. | 507/140 |
| 2,868,726 | 1/1959 | Brukner et al. | 507/140 |
| 2,876,197 | 3/1959 | Watkins | 507/140 |
| 2,896,915 | 7/1959 | Weiss et al. | 507/140 |
| 3,311,553 | 3/1967 | Weiss et al. | 507/140 |
| 4,360,599 | 11/1982 | Løken et al. | 501/147 |
| 4,617,048 | 10/1986 | Salladay et al. | 71/30 |
| 5,309,999 | 5/1994 | Cowan et al. | 507/140 |
| 5,314,022 | 5/1994 | Cowan et al. | 507/140 |

FOREIGN PATENT DOCUMENTS 1684305   10/1991   U.S.S.R. .

OTHER PUBLICATIONS

English–Language Translation of SU 1,684,305 Abstract of SU 751,967 and English–language Abstract of SU751,967.

*Primary Examiner*—Philip Tucker
*Attorney, Agent, or Firm*—Sughrue, Mion, Zinn, Macpeak & Seas

[57] ABSTRACT

A water-in-oil invert emulsion drilling mud is prepared with a nitrogen-containing compound, as a brine solution in the aqueous phase, to prevent the hydration of subterranean formation clays. Suitable nitrogen-containing compounds include alkali metal, alkaline-earth metal and ammonium nitrates and nitrites, and hydrates and complexes thereof. The nitrogen-based invert emulsion mud of the present invention eliminates the use of calcium chloride in the prior art invert emulsion drilling muds, thereby reducing the environmental impact of the drilling operation.

17 Claims, 3 Drawing Sheets

INVERT EMULSION DRILLING MUD

The present invention relates to drilling fluids for borehole drilling operations and, in particular, to drilling muds for oil well drilling operations.

In drilling operations, drilling fluids are used to remove rock cuttings made by a drill bit from the borehole to the surface. The drilling fluid also helps to control subsurface pressures and provides a protective and stabilizing coating to permeable formations.

Drilling fluid is pumped through a hollow drill string and the drill bit into the borehole while the well is being drilled, thereby cooling and lubricating the drill bit and the drill string. The fluid is then forced up the borehole and through the annulus between the drill string and the wall of the borehole to the surface. At the surface, the rock cuttings are filtered from the drilling fluid through a shaker screen and the screened fluid is recirculated to the borehole through the drill string and drill bit.

The consistency and properties of the drilling fluid are monitored and adjusted during the operation, for example, to compensate for pressure changes within the well as the drill bit penetrates the various rock strata.

Specific drilling fluid systems are selected to optimize a drilling operation in accordance with the characteristics of a particular geological formation. A drilling fluid comprising liquid, usually water and/or oil, with solids in suspension is referred to, by those skilled in the art, as a drilling mud. An oil-based drilling mud contains oil as the continuous phase and may also contain water which is dispersed in the continuous phase by emulsification so that there is no distinct layer of water in the mud. Oil muds are normally used to drill swelling or sloughing shales, salt, gypsum, anhydrite or other evaporite formations, hydrogen sulfide-containing formations and to drill hot (>300° F.) holes.

An oil mud containing more than 5% by volume of water is often referred to, by those skilled in the art, as a water-in-oil invert emulsion mud. In addition to oil and water, an invert emulsion mud generally contains clay, an emulsifier, an alkaline substance, such as calcium oxide and hydrated lime, and a surfactant, as well as a brine solution of calcium chloride in the aqueous phase to minimize hydration of clays. Other additives may include filtration control additives, gellants, and weighting materials, such as barite.

A successful drilling operation often depends upon the proper selection and performance of the drilling mud. Although the cost of the drilling mud is only approximately 8% of the total cost of drilling a well, a mud system that performs poorly can cause an increase in other well costs. For example, the density of the mud must be high enough to control excessive formation gas or water pressures but low enough to permit the fastest possible drilling rate.

Moreover, the properties of the drilling mud should be such that the productivity of the reservoir is not hindered. For example, the productivity of the reservoir can be adversely affected by a high solids content, whereby flow channels in the formation can be blocked by mud solids. Conversely, introduction of mud filtrate without solids can sometimes impair the productivity of the reservoir by hydration and swelling of the formation clays.

When a borehole is drilled, drill cuttings, comprised of rock cuttings and invert mud residues, are produced as a waste material. In recent years there has been a substantial effort towards a reduction of the environmental impact of oil-contaminated drill cuttings. In particular, the waste management technique of landfarming has been given considerable attention (Zimmerman, P. K., Robert, J. D. "Oil-based Drill Cuttings Treated by Landfarming" *Oil & Gas Journal*, Aug. 12, 1991).

Landfarming is a natural waste management process with a minimal energy input requirement. A landfarming site is prepared by stripping and stockpiling topsoil and a layer of humus from the site. The drill cuttings are spread over the area and covered with the stockpiled topsoil and humus. The oil-contaminated drill cuttings and soil are then cultivated and mixed, thereby increasing the contact of drill cuttings with indigenous microorganisms in the soil for microbial degradation of the associated oil. Nitrogen fertilizers are added to enhance the activity of the microorganisms. Optionally, a bacterial culture, such as manure, can be added to the site.

The landfarming site can usually be revegetated when the hydrocarbon and chloride contents in the soil are less than 1% and 1000 ppm, respectively, with reclamation of the site in approximately two to four years.

The cost of landfarming is relatively low compared to other disposal methods. Moreover, this method does not cause the air emission problems of smoke and particulate matter which may be of concern in incineration facilities. The practice of landfarming has gained considerable approval from environmental regulatory agencies as a method of dealing with hydrocarbon wastes. Another environmental and economical benefit of landfarming is that the disposal can generally be effected without transport of the drill cuttings.

The oil phase of the drilling mud is degraded by indigenous microorganisms while the aqueous phase is diluted and leached in the landfarming process to reduce the high chloride levels of calcium chloride based invert emulsion muds. The natural process of hydrocarbon degradation can be enhanced by further applications of chemical fertilizers and mechanical cultivation.

The Environmental Regulations Control Board (ERCB, Canada) Guide G50 contains specific guidelines regarding the landfarming of cuttings. Characteristics of the site, such as soil texture (permeability), proximity to surface water, slope, runoff characteristics, depth of ground water and adjacent users of ground water, are considered in these guidelines.

Accordingly the two main factors to be considered in assessing the environmental impact of the drill cuttings produced with the prior art invert emulsion muds are the oil and chloride contents of the drill cuttings. The oil to soil ratio can be minimized with an effective drilling mud. For example, the mud should have a viscosity which enables the removal of rock cuttings from the borehole without retaining drilled solids when passed over a shaker screen. The oil to soil ratio can also be reduced by an even distribution of the drill cuttings over a suitable land area.

However, the use of calcium chloride in the aqueous phase of an invert mud restricts the amount of drill cuttings which can be successfully landfarmed on a given area. This restriction is based on guidelines of the ERCB which sets a maximum loading rate of 800 kg chloride ion per hectare, at which point there is evidence of a detrimental effect on vegetation. Typically, a 3000 meter well (311 mm hole) drilled with a mud having an oil to water ratio of 80:20, using 25% calcium chloride in the aqueous phase, requires 0.72 hectares (based on 260 $m^3$ drill cuttings, 9640 mg/l chloride) for disposal of drill cuttings by landfarming. It will be appreciated by those skilled in the art that an increased land requirement also increases the labour requirement.

While there are environmental and economic benefits of using landfarming as a waste management technique, the land requirement and the reclamation time are still significant factors. Furthermore, there is some concern that ground water may be contaminated by chlorides as they are leached out of the mixture of drill cuttings and soil.

It is an object of the present invention to provide a drilling fluid which further reduces the environmental impact of a drilling operation while providing economic benefits by reducing the land and labour requirements of landfarming the drill cuttings.

According to one aspect of the present invention, there is provided a water-in-oil invert emulsion drilling mud comprising an emulsifier, a surfactant, a clay, an alkaline substance and a nitrogen-containing compound selected from the group consisting of alkali metal, alkaline-earth metal and ammonium nitrates and nitrites, and hydrates and complexes thereof.

According to another aspect of the present invention, there is provided a method of drilling a borehole, comprising the steps of providing a water-in-oil invert emulsion drilling mud in the borehole, recirculating the drilling mud to the surface, screening rock cuttings from the drilling mud and returning the screened drilling mud to the borehole, analysing the properties of the drilling mud, and supplementing the drilling mud with a nitrogen-containing compound selected from the group consisting of alkali metal, alkaline-earth metal and ammonium nitrates and nitrites, and hydrates and complexes thereof.

According to a further aspect of the present invention, there is provided a kit for formulating a water-in-oil invert emulsion drilling mud comprising an emulsifier, a surfactant, a clay, an alkaline substance and a nitrogen-containing compound selected from the group consisting of alkali metal, alkaline-earth metal and ammonium nitrates and nitrites, and hydrates and complexes thereof.

According to still another aspect of the present invention, there is provided the use of a nitrogen-containing compound selected from the group consisting of alkali metal, alkaline-earth metal and ammonium nitrates and nitrites, and hydrates and complexes thereof in a water-in-oil invert emulsion drilling mud.

BRIEF DESCRIPTION OF THE DRAWINGS

In the accompanying drawings which illustrate embodiments of the present invention.

Figure 1:
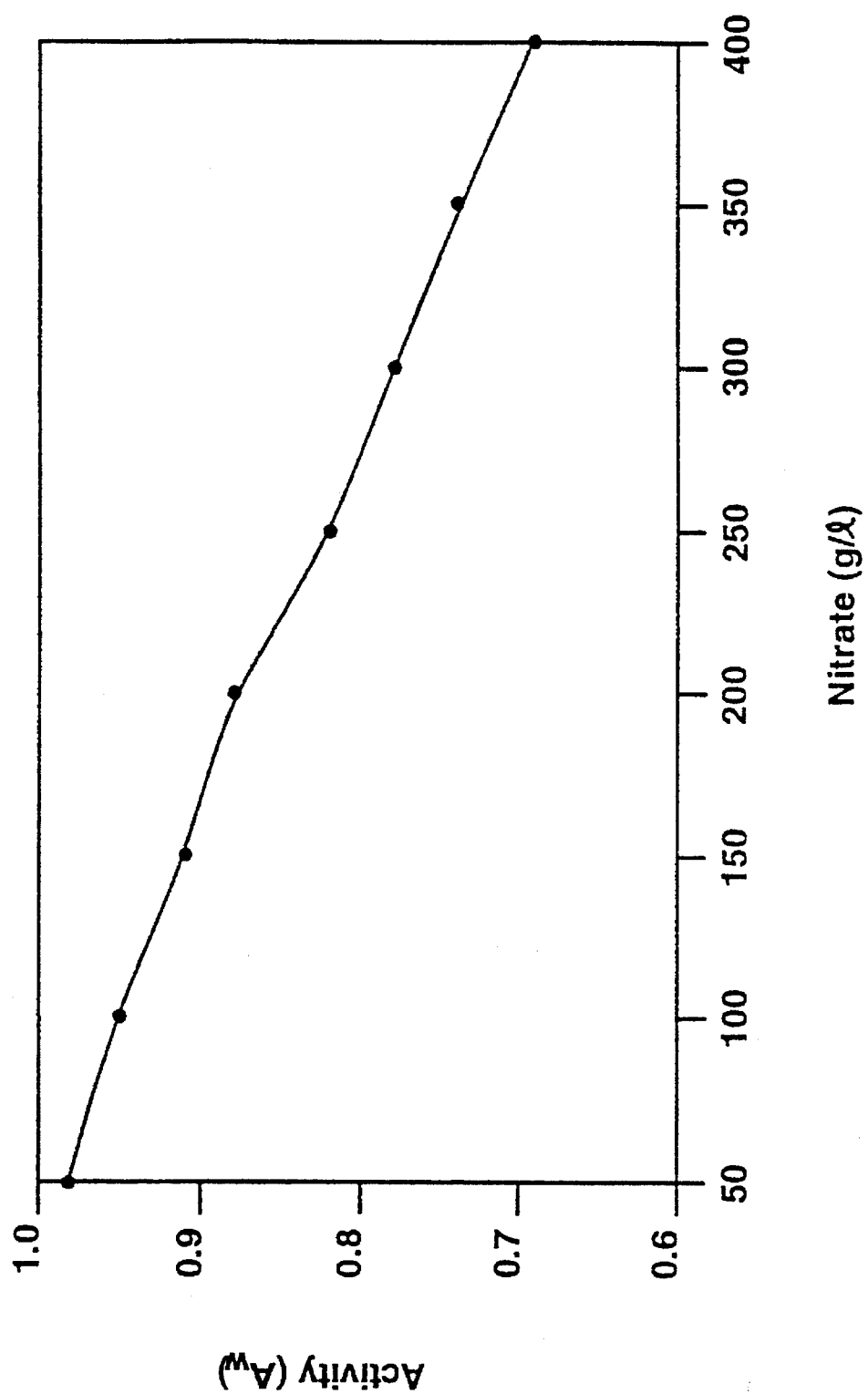
FIG. 1 is a graphical representation of the activity of a nitrogen-based invert as a function of the concentration of nitrate.

In accordance with the present invention, a water-in-oil invert emulsion drilling mud is prepared with a nitrogen-containing compound, as a brine solution in the aqueous phase, to prevent the hydration of formation clays. Suitable nitrogen-containing compounds include alkali and alkaline-earth metal, such as calcium, magnesium, sodium and potassium, and ammonium nitrates and nitrites, hydrates and complexes thereof. Preferred nitrogen-containing compounds are calcium and potassium nitrates or nitrites, and hydrates and complexes thereof. For example, a suitable hydrated calcium nitrate complex is ammonium calcium nitrate decahydrate.

The nitrogen-based invert emulsion mud of the present invention eliminates the use of calcium chloride in the prior art invert emulsion drilling muds. The Environmental Regulations Control Board Guide G50 indicates that a conservative spread rate for nitrogen-containing compounds is 400 kg nitrogen/ha corresponding to approximately 1770 kg nitrate/ha. While there may still be some chloride accumulated in the drill cuttings from natural deposits thereof in the rock formations being drilled, the chloride content is significantly reduced, thereby minimizing the problems associated with the disposal of chlorides, without adversely affecting the performance of the drilling mud. Moreover, the nitrogen required to enhance the microbial degradation of hydrocarbons in a landfarming waste management program is provided without the need to add fertilizers as discussed previously herein.

The nitrogen-containing compound is provided in the invert emulsion mud at a concentration in the range of from about 5 to 80% by weight of the aqueous phase of the mud, depending on the drilling conditions. Preferably, the concentration of the nitrogen-containing compound is in the range of from about 25 to 40% by weight of the aqueous phase.

The ratio of oil to water is dependent on the drilling conditions and economics. The most common invert emulsion muds are formulated with an oil to water ratio of about 80:20 (volume/volume). The concentration of the aqueous phase, however, can range from about 5 to 50% by volume of the mud. Preferably, the concentration of the aqueous phase is in the range of from about 10 to 40% by volume.

Preferably, the oil is diesel oil. However, it will be understood by those skilled in the art that crude and other base oils can also be used. The properties of crude oil can vary however, so that it is usually necessary to perform test runs to determine the appropriate amount of chemical additives to prepare a crude oil-based mud. Diesel oil-based muds are typically more predictable and standard formulations are therefore possible. The concentration of the oil phase can range from about 50 to 95% by volume of the mud. Preferably, the concentration of the oil phase is in the range of from about 60 to 90% by volume.

Various other components are added to provide the desired properties for a drilling mud. In particular, an emulsifier is added to disperse the aqueous phase in the continuous oil phase. Often the emulsifier is added to the invert in the form of a primary and a secondary emulsifier. The primary emulsifier can be, for example, a blend of fatty acids which provides the primary emulsion stability. A suitable primary emulsifier is REEF MUL I (Reef Mud, Calgary, Alberta, Canada). The secondary emulsifier provides additional emulsion stabilization and oil wetting properties with a blend of surfactants. A suitable secondary emulsifier is REEF MUL II (Reef Mud, Calgary, Alberta, Canada).

A clay is used to keep the rock cuttings in suspension as they move up through the borehole to the surface. REEF TONE II (Reef Mud, Calgary, Alberta, Canada) is a suitable bentonite-based organophilic clay viscosity agent. An alkaline substance, such as calcium oxide, provides alkalinity to the system, thereby activating the emulsifier. Hydrated lime may also be used to adjust the pH.

An example of a suitable composition of an 80:20 invert emulsion drilling mud according to the present invention is presented in Table I.

TABLE I

| Nitrogen-Based Invert | |
| --- | --- |
| Diesel Oil | 80% by volume |
| Water | 20% by volume |
| REEF MUL I | 8.5 kg/m$^3$ |
| REEF MUL II | 17 kg/m$^3$ |
| REEF TONE | 14–18 kg/m$^3$ |
| Calcium oxide | 14–16 kg/m$^3$ |
| Ammonium calcium nitrate decahydrate | 40% by weight of the water content |

It will be appreciated, by those skilled in the art, that the concentration of the components of the mud may be varied depending on the particular formulations of emulsifier, surfactant, clay and alkaline substance, as well as on the rock formations, other drilling conditions and economic considerations.

The invert emulsion mud may be prepared by dissolving the nitrogen-containing compound in the water to form a brine solution and separately combining the emulsifier, surfactant, clay and calcium oxide in the oil phase. The brine solution is then introduced to the oil phase for dispersal therein with a high shear mixer. Alternatively, the nitrogen-containing compound may be introduced to the oil phase without previously being dissolved in the aqueous phase. However, it may be necessary to pulverize the nitrogen-containing compound in the latter case, to ensure good mixing.

As discussed previously herein, the invert mud is monitored and analyzed during the drilling operation to determine the required additions. The drilling fluid may be supplemented with a specified volume of a whole mud having the same or different composition as the original mud. Alternatively, individual components of the mud may be added at the surface, depending on the results of ongoing analysis and the desired properties of the mud. Other components, such as weighting materials, may also be added during the course of the drilling operation. In particular, the nitrogen-containing compound may be added to the mud in a solid form or in a partially or completely dissolved state.

Generally, the practice of those involved in the drilling operation is to save a substantial portion of the invert emulsion mud after the drilling operation and to "rebuild" the mud to the desired composition for use in subsequent drilling operations. It will be appreciated by those skilled in the art, that a prior art invert mud using calcium chloride could be "rebuilt" or supplemented during or after the drilling operation with a nitrogen-containing compound or a whole mud in accordance with present invention.

The nitrogen-based invert emulsion mud exhibits fluid properties, including viscosity, gel strength, fluid loss and electrical stability, which are comparable to those of a corresponding calcium chloride based invert.

The following Examples illustrate the invention.

Example 1

A nitrogen-based invert of the present invention was compared with a calcium chloride based invert comprised of equal amounts of the components of the drilling mud. The only difference in the preparation thereof was the brine compound. The invert emulsion mud was prepared with an oil to water ratio of 80:20. The aqueous phase of the nitrogen-based invert was prepared with 35% by weight ammonium calciumnitrate decahydrate. The aqueous phase of the calcium chloride invert was prepared with 35% by weight calcium chloride. The properties of the two invert emulsion muds are compared in Table II.

Table II illustrates that the nitrogen-based invert emulsion mud of the present invention has substantially identical properties to a comparable prior art calcium chloride invert emulsion mud. It will be appreciated, by those skilled in the art, that the values of the fluid properties may change according to the desired fluid properties and the particular composition of the mud. The fluid properties may also vary depending on the particular formulations of emulsifier, surfactant, clay and alkaline substance, as well as on the rock formations, other drilling conditions and economic considerations.

TABLE II

| FLUID PROPERTY | Nitrogen Based Invert | Calcium Chloride Invert |
| --- | --- | --- |
| Oil:Water Ratio | 80:20 | 80:20 |
| Brine (wt % in aqueous phase) | 35% 5Ca(NO$_3$)$_2$.NH$_4$NO$_3$.10H$_2$O | 35% CaCl$_2$ |
| Funnel Viscosity (s/l @50° C.) | 40 | 40 |
| Plastic Viscosity (mPa.s @50° C.) | 5 | 5 |
| Yield Point (Pa @50° C.) | 2 | 2.5 |
| Gel Strength (Initial/10 min) | 1/1.5 | 1.5/2.0 |
| HP-HT Fluid Loss (cm$^3$/30 min @3500 kPa, 50° C.) | 6.0 | 6.0 |
| Electrical Stability (V) | 490 | 495 |
| Solids (Corrected) | 0.06 | 0.06 |

As mentioned previously, adjustment of the viscosity of the mud allows for the removal of rock cuttings from the borehole without retaining solids when passed over the shaker screen. The yield point is the resistance to initial flow and represents the stress required to start fluid movement. The resistance to flow is due to electrical charges located on or near the surface of the particles. Gel strength is a measure of the ability of a colloid to form gels. This is of particular concern during tripping operations when the drill string is retrieved in order to replace the drill bit. HP-HT Fluid Loss is a measure of the relative amount of fluid lost (at a high pressure of 35000 kPa and a high temperature of 50° C.) through permeable formations when the drilling fluid is subjected to a pressure differential. Electrical stability is used to determine the emulsion stability of the drilling mud. The voltage indicated in Table II is the voltage at the point of emulsion breakdown. The data presented in Table II illustrates that the fluid properties of the nitrogen-based invert are substantially identical to a comparable calcium chloride invert.

The salinity of the aqueous phase of an invert emulsion drilling mud can be estimated by measuring the relative humidity of the vapour phase above a sample of mud in a closed container. The relative humidity can be expressed as water activity. A low water activity represents a high concentration of salt in solution and conversely a high water activity represents a low concentration of salt in solution.

The nitrogen-based mud of Table II has an activity of approximately 0.8, while the calcium chloride based invert has an activity of approximately 0.5. Accordingly, more nitrate is required to provide an invert of a similar activity to a comparable calcium chloride based invert.

Laboratory testing predicted an adequate emulsion stability. However, in field testing, a slightly higher emulsion stability, substantially the same as that for the calcium chloride based invert, was demonstrated.

Example 2

A well was drilled in the Ricinus area of Western Alberta, Canada. The Ricinus area is characterized by sloughing shale and other general borehole problems. Previously, the most successful mud systems in the Ricinus area utilized potassium chloride water-based muds and calcium chloride invert muds.

The volume of drilling fluid required was estimated and prepared off-site in accordance with the composition listed in Table I. The oil mud was prepared with a diesel oil to water ratio of 80:20. The aqueous phase was formulated with 40% ammonium calcium nitrate decahydrate. The drilling fluid was transported to the drilling site after preparation.

Prior to well spudding, a sample of the drilling mud was tested to determine the activity of the mud. The mud engineer used this data, as shown in FIG. 1, to determine the rate of addition of ammonium calcium nitrate decahydrate to the drilling mud throughout the drilling operation. The activity was maintained in the range of from about 0.7 to 0.8.

Figure 2:
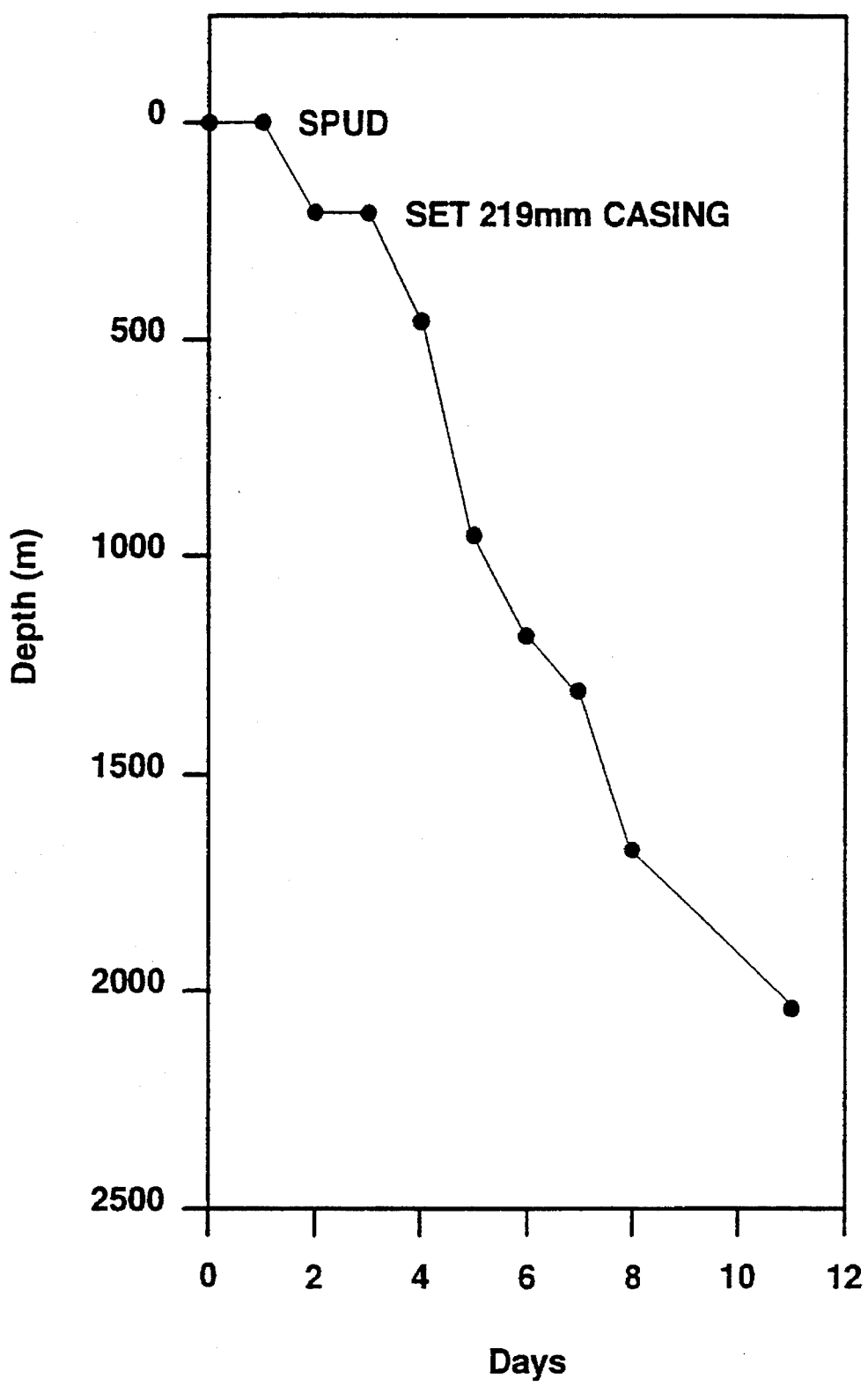
FIG. 2 is a graphical representation of the depth of the borehole drilled with a drilling mud in accordance with the present invention.

As shown in FIG. 2, a 219 mm casing was set on Day 3 to a depth of 225 m. Thereafter the borehole was drilled with a 200 mm drill bit. The initial volume of drilling mud was 65 $m^3$ with a composition as described in Table III.

TABLE III

| COMPONENT | % VOLUME |
|---|---|
| Diesel Oil | 0.76 |
| Water | 0.18 |
| Ammonium calcium nitrate decahydrate | 0.0957 |
| Primary Emulsifier | 0.00873 |
| Secondary Emulsifier | 0.0174 |
| Clay | 0.0145 |
| Calcium Oxide | 0.0143 |

The properties of the drilling fluid and other aspects of the drilling operation, for example the shaker screens, were analyzed and various components were added to the drilling fluid over the length of the run. In particular, drilling fluid was supplemented to compensate for the increasing volume required for the hole and for fluid loss.

The well was drilled to a depth of 2050 meters in eleven days. The previous record with the above-mentioned prior art drilling muds was thirteen days. A summary of the depth of the borehole is illustrated in FIG. 2.

Figure 3:
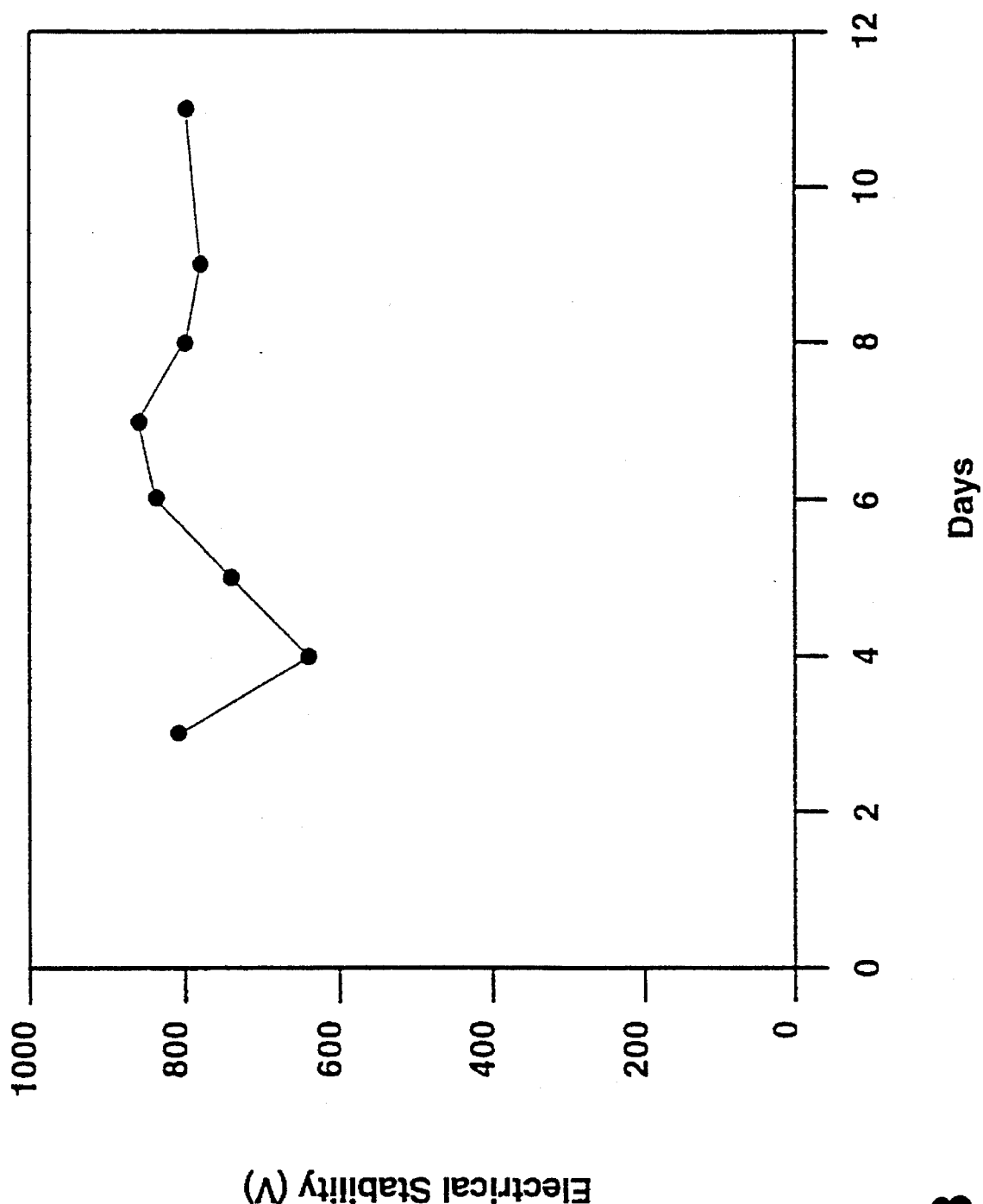
FIG. 3 is a graphical representation of the electrical stability of the drilling mud of the present invention during the drilling operation.

During the drilling operation, electrical stability tests were conducted. The results are presented in FIG. 3. The decrease in voltage at Day 9 corresponds to the addition of primary and secondary emulsifiers, REEF MUL I and REEF MUL II, respectively.

After drilling, the characteristics of the borehole were tested with a calliper log. As previously mentioned, the hole was drilled with a 200 mm bit. The calliper log was lowered into the borehole and the geometry was monitored electronically as the calliper log was raised to the surface. In particular, the borehole was monitored to determine whether there was any washout which would be indicated by an oversized hole. The calliper log indicated a 199.9 mm hole demonstrating that the drilling fluid prevented washout during drilling. The quality of the calliper log was excellent.

During the drilling operation, drilling mud was circulated from a mud tank to the borehole and over a shaker screen. The screened mud was returned to the mud tank and the mixture of rock cuttings and mud which did not pass through the shaker screen was collected as drill cuttings.

The total amount of drill cuttings collected during the course of the drilling operation was approximately 112 $m^3$. The drill cuttings were analyzed to determine a nitrate content of 5280 mg/l of mud on the rock cuttings, corresponding to a total of 318 kg nitrates. The ERCB guideline is 1770 kg nitrates/ha so that the calculated area required for landfarming would amount to 0.18 ha for 112 $m^3$ of drill cuttings.

As discussed previously in Example 1, a comparable prior art invert emulsion mud would require a lower calcium chloride concentration of approximately 25% by weight to achieve the same activity. For comparison purposes, the results of cuttings analyses for six boreholes drilled in western Alberta with an 80:20 calcium chloride (25%) based invert were reviewed to determine the average landfarming area requirement for the prior art invert emulsion mud. The average chloride concentration was 9640 mg/l of mud on the rock cuttings and the average volume of cuttings produced was 100 $m^3$. Accordingly, the average landfarming requirement would be 0.42 ha for 100 $m^3$ of drill cuttings. Accordingly the difference in land requirement for disposal of the drill cuttings is 0.24 ha, corresponding to a reduction in land requirement of approximately 60% for equal volumes of drill cuttings.

While calcium chloride based inverts require the addition of a high nitrogen fertilizer, a drilling mud in accordance with the present invention, using ammonium calcium nitrate decahydrate does not require the addition of further fertilizers for landfarming treatment of drill cuttings. Furthermore, the nitrates are evenly distributed with respect to the hydrocarbons thereby enhancing microbial degradation of the hydrocarbons.

Example 3

A sample of the nitrate-based invert mud was tested on a sandstone core having a length of 2 inches and a diameter of 1.5 inches. The reservoir that the core was sampled from contains 1 to 2% smectites and is very sensitive to fresh water.

The core was saturated with water and mounted under reservoir conditions of temperature, pressure and net overburden pressure. A volume of crude oil corresponding to 5 times the pore volume of the sample was then pumped over a first face of the core and a base permeability, representing the flow of crude oil from the first face to the second face of the core, was established.

The nitrogen-based invert emulsion mud of the present invention was then circulated over the second face of the core at overbalance conditions, as dictated by the reservoir depth, pressure and drilling fluid density. The mud was supplied to the core by a constant rate delivery pump at a rate of 2 ml/minute, while a second pump received the mud and maintained the overbalance pressure. An 0.5 inch spacer between the face of the core and the flow head allowed for filter cake build-up. The filtrate which passed through the core was monitored.

After circulation of the drilling mud across the second face, crude oil was again pumped across the first face and the flow from the first face to the second face was measured and compared with the base permeability to determine a regain permeability of 97%. Regain permeability is a function of throughput for a minimum of twenty pore volumes.

We claim:

1. A water-in-oil invert emulsion drilling mud comprising an emulsifier, a surfactant, a clay, an alkaline substance and a nitrogen-containing compound selected from the group consisting of hydrated complex alkali metal ammonium nitrates and nitrites and hydrated complex alkaline earth metal ammonium nitrates and nitrites, for reducing or preventing hydration of subterranean formation clays, wherein the concentration of water in the mud is in the range of from about 5 to 50% by volume and the concentration of the nitrogen-containing compound is in the range of from about 5 to 80% by weight of the water.

2. A water-in-oil invert emulsion drilling mud according to claim 1, wherein the nitrogen-containing compound is a hydrated complex ammonium calcium nitrate or nitrite.

3. A water-in-oil invert emulsion drilling mud according to claim 1, wherein the concentration of the nitrogen-containing compound in the mud is in the range of from about 25 to 40% by weight of the water.

4. A water-in-oil invert emulsion drilling mud according to claim 1, wherein the concentration of water in the mud is in the range of from about 10 to 40% by volume.

5. A water-in-oil invert emulsion drilling mud according to claim 1, wherein the oil is crude oil or diesel oil.

6. A water-in-oil invert emulsion drilling mud according to claim 5, wherein the concentration of oil in the mud is in the range of about 60 to 90% by volume.

7. In a method of drilling a borehole, comprising the steps of providing an initial water-in-oil invert emulsion drilling mud in the borehole, recirculating the drilling mud to the surface, screening rock cuttings from the drilling mud and returning the screened drilling mud to the borehole, and analysing the properties of the drilling mud, the improved step of supplementing the drilling mud with a nitrogen-containing compound for reducing or preventing hydration of subterranean formation clays, where the concentration of water in the mud is in the range of from about 5 to 50% by volume and the concentration of the nitrogen-containing compound is in the range of from about 5 to 80% by weight of the water, wherein the nitrogen-containing compound is selected from the group consisting of hydrated complex alkali metal ammonium nitrates and nitrites and hydrated complex alkaline earth metal ammonium nitrates and nitrites.

8. A method according to claim 7, wherein the initial water-in-oil invert emulsion drilling mud comprises an emulsifier, a surfactant, a clay, an alkaline substance and the nitrogen-containing compound.

9. A method according to claim 7, wherein the nitrogen-containing compound is ammonium calcium nitrate decahydrate.

10. A method according to claim 7, wherein the concentration of the nitrogen-containing compound in the mud is in the range of from about 25 to 40% by weight of the water.

11. A method according to claim 7, wherein the concentration of water in the mud is in the range of about 10 to 40% by volume.

12. A method according to claim 7, wherein the oil is crude oil or diesel oil.

13. A method according to claim 12, wherein the concentration of oil in the mud is in the range of about 60 to 90% by volume.

14. A kit for formulating a water-in-oil invert emulsion drilling mud comprising an emulsifier, a surfactant, a clay, an alkaline substance and a nitrogen-containing compound for reducing or preventing hydration of subterranean formation clays, wherein the nitrogen-containing compound is selected from the group consisting of hydrated complex alkali metal ammonium nitrates and nitrites and hydrated complex alkaline earth metal ammonium nitrates and nitrites.

15. A kit according to claim 14, wherein the nitrogen-containing compound is the hydrated complex ammonium calcium nitrate or nitrite.

16. A water-in-oil invert emulsion drilling mud according to claim 2, wherein the nitrogen-containing compound is ammonium calcium nitrate decahydrate.

17. A kit according to claim 15, wherein the nitrogen-containing compound is ammonium calcium nitrate decahydrate.

* * * * *